US011875768B2

(12) United States Patent
Nielsen et al.

(10) Patent No.: US 11,875,768 B2
(45) Date of Patent: Jan. 16, 2024

(54) WEARABLE ACTIVE NOISE REDUCTION (ANR) DEVICE HAVING LOW FREQUENCY FEEDBACK LOOP MODULATION

(71) Applicant: Bose Corporation, Framingham, MA (US)

(72) Inventors: Ole Mattis Nielsen, Cambridge (GB); David J. Warkentin, Boston, MA (US); Lei Cheng, Wellesley, MA (US); Brandon Lee Olmos, Cambridge, MA (US); Michael P. O'Connell, Northborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/149,834

(22) Filed: Jan. 4, 2023

(65) Prior Publication Data

US 2023/0144087 A1 May 11, 2023

Related U.S. Application Data

(63) Continuation of application No. 17/488,509, filed on Sep. 29, 2021, now Pat. No. 11,568,849, which is a (Continued)

(51) Int. Cl.
*G10K 11/178* (2006.01)
*H04R 1/10* (2006.01)
*H04R 3/00* (2006.01)

(52) U.S. Cl.
CPC ....... *G10K 11/1781* (2018.01); *H04R 1/1083* (2013.01); *H04R 3/002* (2013.01); (Continued)

(58) Field of Classification Search
CPC ....... G10K 11/17881; G10K 11/17885; G10K 2210/3028; G10K 11/17853; (Continued)

(56) References Cited

U.S. PATENT DOCUMENTS 8,073,150 B2 12/2011 Joho et al.
8,073,151 B2 12/2011 Joho et al.
(Continued)

FOREIGN PATENT DOCUMENTS

GB 2172470 A 9/1986 ......... G10K 11/1784
JP 540486 A 2/1993
(Continued)

OTHER PUBLICATIONS

PCT International Search Report and Written Opinion for International Application No. PCT/US2021/020842, dated Jun. 7, 2021, 97 pages.
(Continued)

*Primary Examiner* — Kile O Blair
(74) *Attorney, Agent, or Firm* — Hoffman Warnick LLC

(57) ABSTRACT

Various aspects include a wearable audio device having active noise reduction (ANR). In some cases, an ANR system for a wearable audio device includes: a fixed filter that receives a signal from a feedback microphone and outputs a noise reduction signal, where the fixed filter is configured to provide ANR with a nominal loop gain; and a tunable filter that outputs an adjusted noise reduction signal by modulating the nominal loop gain in response to low frequency noise being detected in the noise reduction signal, where modulating the nominal loop gain includes reducing low frequency ANR performance.

20 Claims, 5 Drawing Sheets

Related U.S. Application Data continuation of application No. 16/811,148, filed on Mar. 6, 2020, now Pat. No. 11,164,554.

(52) U.S. Cl.
CPC ................ *G10K 2210/1081* (2013.01); *G10K 2210/3026* (2013.01); *G10K 2210/3056* (2013.01); *H04R 2460/01* (2013.01)

(58) Field of Classification Search
CPC ..... G10K 11/17854; G10K 2210/3056; G10K 11/17817; G10K 2210/3055; G10K 11/17855; G10K 11/17813; G10K 11/17879
See application file for complete search history.

(56) References Cited

U.S. PATENT DOCUMENTS

| | | | |
|---|---|---|---|
| 9,082,388 | B2 | 7/2015 | Annunziato et al. |
| 2018/0286373 | A1 | 10/2018 | O'Connell et al. |
| 2018/0286375 | A1 | 10/2018 | Cattell et al. |

FOREIGN PATENT DOCUMENTS

| | | | |
|---|---|---|---|
| WO | 8900746 | A1 | 1/1989 |
| WO | 2013184357 | A2 | 12/2013 |

OTHER PUBLICATIONS

Japanese Office Action for Application No. 2022-553149, dated Oct. 2, 2023, 11 pages.

WEARABLE ACTIVE NOISE REDUCTION (ANR) DEVICE HAVING LOW FREQUENCY FEEDBACK LOOP MODULATION

CLAIM OF PRIORITY

This continuation application claims priority to co-pending U.S. patent application Ser. No. 17/488,509, filed on Sep. 29, 2021, which is a continuation of Issued U.S. Pat. No. 11,164,554 (U.S. patent application Ser. No. 16/811,148 filed on Mar. 6, 2020), the contents of each of which is hereby incorporated by reference in its entirety.

TECHNICAL FIELD

This disclosure generally relates to technology for controlling overload conditions in active noise reducing (ANR) devices.

BACKGROUND

Headphones and other physical configurations of a personal ANR device worn about the ears of a user for purposes of isolating the user's ears from unwanted environmental sounds have become commonplace. ANR devices counter unwanted environmental noise with the active generation of anti-noise signals. These ANR devices contrast with passive noise reduction (PNR) headsets, in which a user's ears are simply physically isolated from environmental noises. Especially of interest to users are ANR audio devices such as headphones, earphones and/or other head-worn audio devices that also incorporate audio listening functionality, thereby enabling a user to listen to electronically provided audio (e.g., playback of recorded audio or audio received from another device) without the intrusion of unwanted environmental noise. However, conventional ANR audio devices can fail to adequately manage noise under certain conditions, for example, under overload conditions.

SUMMARY

All examples and features mentioned below can be combined in any technically possible way.

Systems and methods are disclosed that describe an ANR device having a feedback compensator that employs a tunable filter to address overload conditions caused by adverse low frequency events.

In some aspects, a wearable audio device having ANR is provided. The device includes: a feedback microphone; an electroacoustic transducer; and a feedback compensator configured to output a noise reduction signal to the electroacoustic transducer in response to a feedback signal from the feedback microphone. The feedback compensator includes a tunable filter that modulates a loop gain in response to an adverse low frequency event being detected in the noise reduction signal outputted from the tunable filter, wherein the tunable filter is configured to maintain a substantially similar loop gain shape near a low frequency cross-over as the low frequency cross-over changes during loop gain modulation.

In particular aspects, a feedback compensator for an ANR device is provided and configured to output a noise reduction signal to an electroacoustic transducer in response to a feedback signal from a feedback microphone. The feedback compensator includes a tunable filter that modulates a loop gain in response to an adverse low frequency event being detected in the noise reduction signal outputted from the tunable filter. The tunable filter is configured to maintain a substantially similar loop gain shape near a low frequency cross-over as the low frequency cross-over changes during loop gain modulation.

In other aspects, an active noise reduction (ANR) system for a wearable device is provided that includes: a fixed filter that receives a signal from a feedback microphone and outputs a noise reduction signal, wherein the fixed filter is configured to provide ANR with a nominal loop gain; and a tunable filter that outputs an adjusted noise reduction signal by modulating the nominal loop gain in response to low frequency noise being detected in the noise reduction signal, wherein modulating the nominal loop gain includes reducing low frequency ANR performance.

In further aspects, a method is disclosed that provides active noise reduction (ANR) for a wearable device. The method includes: processing a signal from a feedback microphone to generate a noise reduction signal using ANR with a nominal loop gain; and modulating the nominal loop gain in response to low frequency noise being detected in the noise reduction signal, wherein modulating the nominal loop gain includes reducing low frequency ANR performance.

In still further aspects, a wearable audio device having active noise reduction (ANR) is disclosed and includes: a feedback microphone; an electroacoustic transducer; and a feedback compensator configured to output a noise reduction signal to the electroacoustic transducer in response to a signal from the feedback microphone according to a method that includes: processing the signal from the feedback microphone to generate a noise reduction signal using ANR with a nominal loop gain; and modulating the nominal loop gain in response to low frequency noise being detected in the noise reduction signal, wherein modulating the nominal loop gain includes reducing low frequency ANR performance.

Implementations may include one of the following features, or any combination thereof.

In certain cases, the feedback compensator includes a logic processor configured to calculate a frequency multiplier value in response to an adverse low frequency event being detected in the noise reduction signal outputted from the tunable filter.

In particular aspects, the frequency multiplier value is calculated according to a method that includes: comparing the noise reduction signal to a threshold indicative of an adverse low frequency event; and in response to the noise reduction signal exceeding the threshold, calculating a current frequency multiplier value.

In some cases, the method further includes comparing the current frequency multiplier value with a previous frequency multiplier value to determine whether the adverse low frequency event is increasing or dissipating.

In some implementations, the current frequency multiplier value is output to the tunable filter in response to the current frequency multiplier value being greater than the previous frequency multiplier value.

In particular implementations, an adjusted frequency multiplier value is output to the tunable filter based on a decay function implemented by the logic processor in response to the current frequency multiplier value being less than the previous frequency multiplier value.

In some cases, an adjusted frequency multiplier value is output to the tunable filter based on an estimator that predicts adverse low frequency events.

In certain cases, the feedback compensator further includes a fixed filter configured to filter the feedback microphone signal and output a filtered signal to the tunable filter.

In various implementations, the substantially similar loop gain shape near the low frequency cross-over includes a substantially shaped magnitude and phase.

In some cases, the tunable filter is configured to change the low frequency cross-over by a factor determined by an inputted frequency multiplier value.

In some cases, modulating the nominal loop gain further includes returning the low frequency ANR performance back to a normal operating level.

In some cases, the low frequency ANR performance is returned back to a normal operating level in response to low frequency noise no longer being detected.

In some cases, returning the low frequency ANR performance back to the normal operating level is implemented with a decay function.

In some cases, reducing low frequency ANR performance includes modulating signals below approximately 100 Hz.

In some cases, a reduction in low frequency ANR performance is determined based on an amount of low frequency noise being detected.

In some cases, a loop gain shape is substantially maintained as a low frequency cross-over increases or decreases during the loop gain modulation.

In some cases, the tunable filter is configured to change the low frequency cross-over by a factor determined by an inputted frequency multiplier value.

In some cases, maintaining a substantially similar loop gain shape as the low frequency cross-over increases or decreases provides a balance between the low frequency ANR performance and ANR stability margins.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
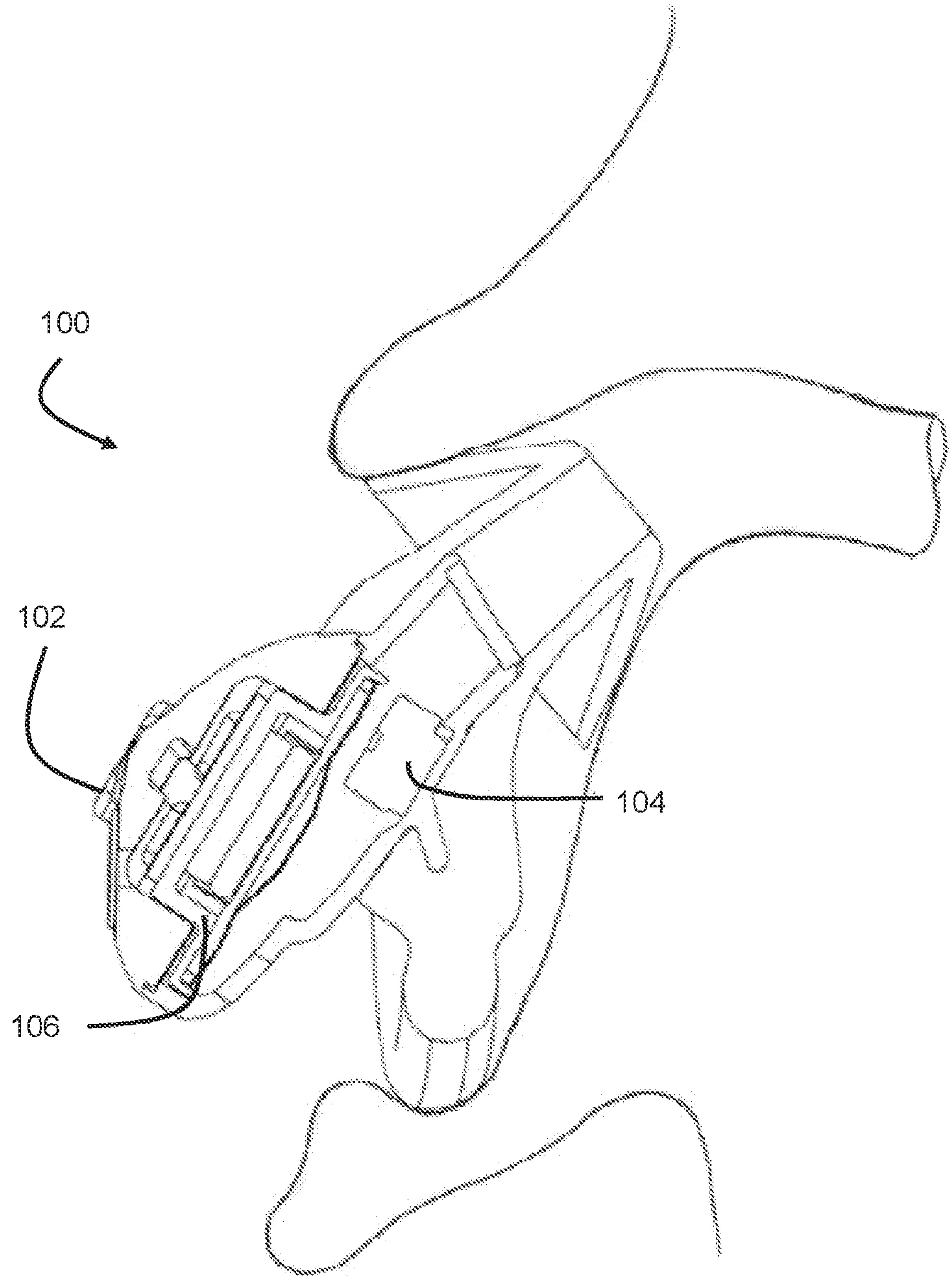
FIG. 1 depicts an ANR device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a feedback compensator can be introduced in a wearable active noise reduction (ANR) audio device to provide improved performance. For example, an ANR audio device can include a feedback compensator configured to address adverse low frequency events.

Embodiments of the present disclosure are directed at an active noise reduction (ANR) device with a feedback compensator configured to address overload conditions resulting from adverse low frequency events. In some embodiments, the ANR device can include a configurable digital signal processor (DSP), which can be used for implementing various signal flow topologies and filter configurations. Examples of such DSPs are described in U.S. Pat. Nos. 8,073,150 and 8,073,151, which are incorporated herein by reference in their entirety. FIG. 1 depicts an illustrative in-ear ANR device 100 that includes a feedforward microphone 102, a feedback microphone 104, an output transducer 106 (which may also be referred to as an electroacoustic transducer or acoustic transducer), and a noise reduction circuit (not shown) coupled to both microphones and the output transducer to provide anti-noise signals to the output transducer based on the signals detected at both microphones. An additional input (not shown in FIG. 1) to the circuit provides additional audio signals, such as music or communication signals, for playback over the output transducer 106 independently of the noise reduction signals. U.S. Pat. No. 9,082,388, also incorporated herein by reference in its entirety, describes an implementation of an in-ear ANR device, similar to that shown in FIG. 1.

Although shown as an in-ear device in FIG. 1, the features of ANR device 100 may be incorporated in any type of wearable personal acoustic device, including headsets, headphones, in-ear, around-ear or over-the-ear headsets, earphones, and hearing aids. Typical headsets or headphones can include an earbud or ear cup for each ear. The earbuds or ear cups may be physically tethered to each other, for example, by a cord, an over-the-head bridge or headband, or a behind-the-head retaining structure. In some implementations, the earbuds or ear cups of a headphone may be connected to one another via a wireless link.

Figure 2:
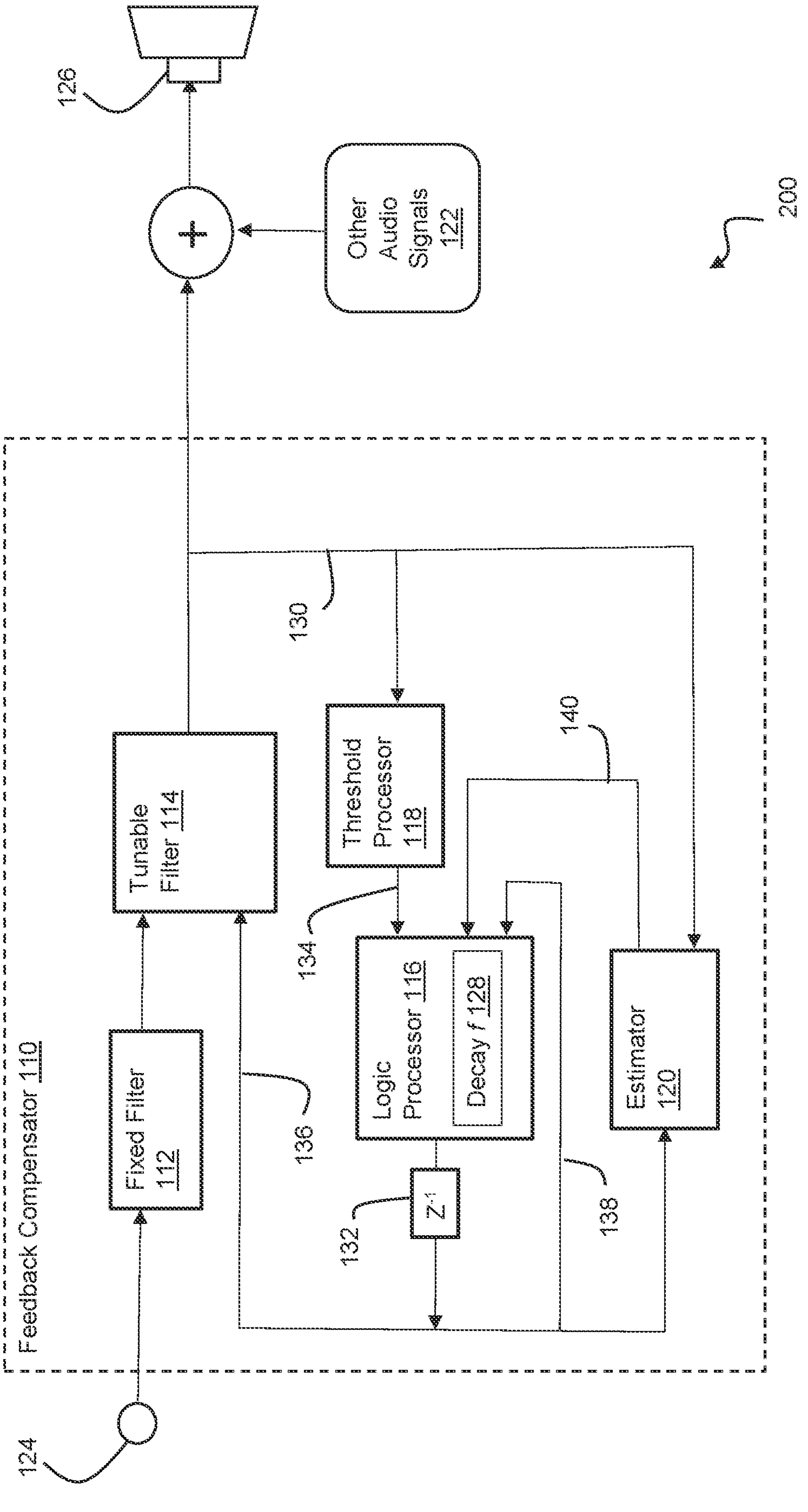
FIG. 2 depicts a block diagram of an ANR device having feedback compensator that includes a tunable filter according to various implementations.

FIG. 2 depicts an illustrative block diagram of an ANR device 200 that includes a feedback compensator 110 to reduce the effects of a noise signal picked up by one or more feedback microphones 124. In this case, a feedback noise reduction path 130 drives the output transducer 126 to generate an anti-noise signal. This illustrative signal flow topology also includes other audio signals 122 such as feedforward noise reduction, music or communication signals for playback over the output transducer 126.

During nominal operating conditions, the acoustic noise energy that a typical ANR device attempts to reduce is small enough to keep the system hardware within normal operational capacity. However, in some circumstances, discrete acoustic signals or low frequency pressure disturbances (e.g., loud pops, bangs, door slams, etc.) referred to herein as "adverse low frequency events," picked up by the feedback microphones can cause the noise reduction circuitry to overrun the capacity of the electronics or the output transducer in trying to reduce the resulting noise, thereby creating audible artifacts which may be deemed objectionable by some users. In other instances, adverse low frequency events are internally generated, e.g., when a user walks with heavy footsteps or chews crunchy foods, the ear canal walls of the user can vibrate and create a large amount of pressure with inserted earbuds. These conditions, which are referred to herein as overload conditions, can be manifested by, for example, clipping of amplifiers, approaching or exceeding hard excursion limits of acoustic drivers or transducers, or levels of excursion that cause sufficient change in the acoustics response so as to cause oscillation and/or cause the driver to go non-linear and distort audio.

The problem of overload conditions can be particularly significant in small form-factor ANR devices such as in-ear headphones. For example, in order to compensate for an adverse low frequency event (e.g., a bus going over a pothole, a door slam, or the sound of an airplane taking off), a conventional feedback compensator operating under nominal conditions may generate a signal that would require the acoustic transducer to exceed the corresponding physical excursion limit. Due to acoustic leaks, the excursion or driver displacement to create a given pressure typically increases with decreasing frequencies. For example, a particular acoustic transducer may need to be displaced 1 mm to generate an anti-noise signal for a 100 Hz noise, 2 mm to generate an anti-noise signal for a 50 Hz noise, and so on. Many acoustic transducers, particularly small transducers used in small form-factor ANR devices are physically incapable of producing such large displacements. In such cases, the high displacement demand by a compensator can cause the transducer to generate sounds that cause audible artifacts, which may contribute to an objectionable user experience. The audible artifacts can include oscillations, potentially objectionable transient sounds (e.g., "thuds," "cracks," "pops," or "clicks"), or crackling/buzzing sounds.

The feedback compensator 110 shown in FIG. 2 addresses the aforementioned issues by providing a tunable filter 114 that modulates a loop gain in response to an adverse low frequency event detected in the noise reduction signal 130 outputted from the tunable filter 114. In this illustrative embodiment, a fixed filter 112 first receives signals from the feedback microphone 124, and then passes filtered signals to the tunable filter 114. The fixed filter 112 may for example comprise a typical filter used to provide feedback based ANR and provides nominal loop gain. Loop gain, which is adjusted in response to the feedback signal by the tunable filter 114, generally includes the feedback filter response (as implemented by tunable filter 114) multiplied by the plant transfer function, i.e., the transfer function from the transducer 126 voltage to the microphone 124 voltage.

In some embodiments, the tunable filter 114 is configured to modulate the loop gain in such a way that the low frequency cross-over is increased and decreased while maintaining a similar loop gain shape near that cross-over. In this manner, tunable filter 114 is able to change its filter response based on feedback signals such that as the low frequency cross-over moves, the feedback loop gain maintains a substantially similarly shaped magnitude and phase near the low frequency cross-over. Maintaining a substantially similar loop gain shape ensures that a desirable trade-off between stability margins and ANR performance is maintained at all times, while making sure that the device 200 does not try to react to low frequency noise (often sub-sonic) that is too loud for the device to handle.

In addition, in some embodiments, a logic processor 116 is employed to determine when the feedback compensator 110 needs to modulate, by how much, and when to return to the nominal condition. In one approach, when an adverse event is detected, the logic processor 116 utilizes a fast attack strategy that causes the tunable filter 114 to immediately reduce low frequency ANR performance (to address the adverse effect as soon as possible) followed by a slow decay in which lower frequency performance gracefully recovers (to minimize transient artifacts and unnecessary back and forth modulation due to repeated or successive overload events). In some cases, an estimator 120 is provided to determine whether additional adverse events are being encountered while the tunable filter 114 is modulated, so as to not move back to nominal operation until the problematic events are no longer occurring. Although not shown, in some approaches, estimator 120 can also process signals from feedback and feedforward microphones or other inputs such as output from a machine learning model on a remote accessory device such as a phone.

In the illustrative embodiment shown, a threshold processor 118 compares the noise reduction signal 130 with a threshold indicative of an adverse low frequency event. In various implementations, if the threshold processor 118 detects that the threshold is not exceeded, low frequency ANR performance is maintained at a nominal level to provide desired ANR processing. In response to the threshold processor 118 detecting that the noise reduction signal 130 exceeds the threshold, a frequency multiplier value (FMV) 134 is determined (e.g., continuously ranging from 1-6, in which 1 indicates a nominal condition) based on an amount by which the threshold was exceeded. For example, if the threshold is only slightly exceeded, then a frequency multiplier value FMV=2 is assigned. If the threshold is exceeded by a large amount, then a frequency multiplier value FMV=6 is assigned. The frequency multiplier value 134 is then sent to the logic processor 116, which after a delay 132, sends an adjusted frequency multiplier value 136 to the tunable filter 114 to potentially modulate the loop gain. In some embodiments, the logic processor 116 adjusts the frequency multiplier value 134 based on: (1) the delayed, i.e., previous, frequency multiplier value 138; and (2) the estimator output 140.

In one approach, the logic processor 116 compares the current frequency multiplier value 134 with the previous frequency multiplier value 138 to determine whether the adverse low frequency event is increasing or dissipating. If the adverse low frequency event is increasing (i.e., the current value 134 is greater than the previous value 138), then the current frequency multiplier value 134 is outputted to the tunable filter 114 without modification as a fast attack to immediately address the event. Alternatively, if the current frequency multiplier value 134 is less than the previous frequency multiplier value 138, then the current frequency multiplier value 134 is adjusted and outputted to the tunable filter 114 based on: (1) a decay function 128 implemented by the logic processor 116; and (2) the estimator output 140.

The decay function 128 may, for example, include a time based function that gracefully reduces the initial fast attack frequency multiplier value over a period until it reaches a nominal state. For example, the decay function 128 may specify a continuous range of values for the tunable filter 114. The estimator output 140 may further alter the behavior of the decay function 128 if estimator 120 determines that additional adverse events are occurring. For example, if the user of the device 200 is running, each step may create an adverse low frequency event. Under these conditions, estimator 120 may cause the logic processor 116 to maintain a moderate frequency multiplier value rather than repeatedly generating higher fast attack values or lower decaying values.

In an illustrative example, the FMV might first go to a high value, e.g., 5. After a short time (e.g., a quarter of a second) the FMV will then decay to, e.g., 3, over some length of time. The FMV will then stay at that level for a period of time, e.g., two seconds, before doing a graceful decay back to 1. If the estimator 120 detects further adverse events, this two second time period will be reset. Accordingly, if the adverse events keep happening with less than two seconds in between, the FMV will remain at 3 until they stop occurring.

In an illustrative approach, estimator 120 passes the current driver signal 130 through another modulating filter. This modulating filter is not the same as tunable filter 114, but using estimates, it turns the current driver signal 130 into what it would have been if tunable filter 114 had not applied, essentially undoing what tunable filter 114 does (although not in an inverse fashion since estimator 120 is outside the loop.

Figure 3:
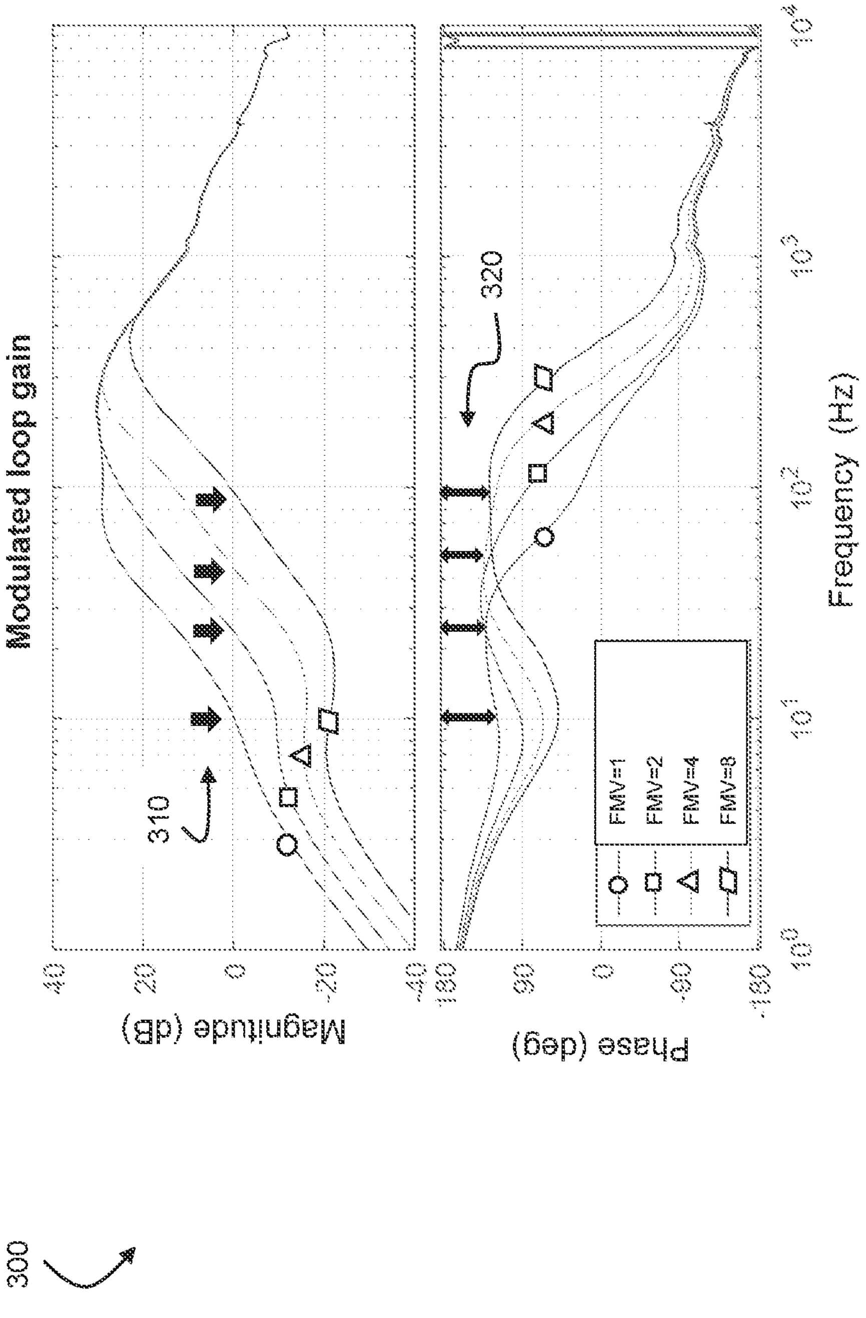
FIG. 3 depicts a graph showing different feedback loop gains for a tunable filter according to various implementations.

In various embodiments, tunable filter 114 is implemented to maintain a substantially similar loop gain shape as the low frequency cross-over increases or decreases during modulation. An example of this is shown in FIG. 3 in which magnitude and phase plots 300 associated with four different loop gains (e.g., resulting from different inputted frequency multiplier values) shown as FMV=1, which corresponds to an original or nominal signal, FMV=2, which corresponds to one octave higher than the original), FMV=4, which corresponds to two octaves higher than the original and FMV=8, which corresponds with three octaves higher than the original are depicted. As seen in the magnitude graph on top, each loop gain plot has a substantially similar shape (i.e., slope) at the low frequency cross-over (i.e., the approximate point where the magnitude crosses zero), as indicated by arrows 310. Similarly, as seen in the phase graph on the bottom, each loop gain has a substantially similar phase offset relative to 180 degrees at the low frequency cross-over, as indicated by arrows 320.

Figure 4:
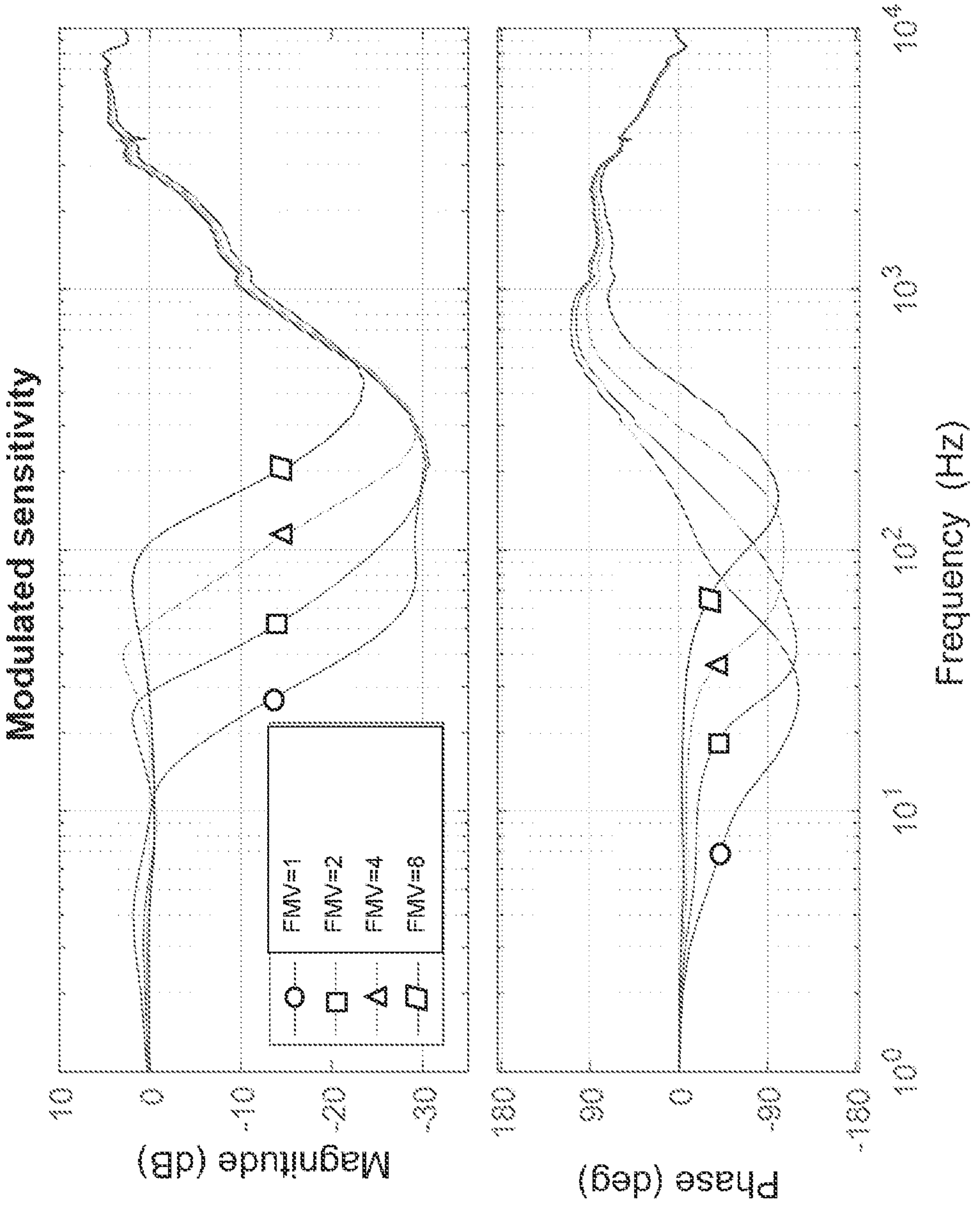
FIG. 4 depicts a graph showing loop gain sensitivity for different filter settings for a tunable filter according to various implementations.

FIG. 4 depicts further graphs of magnitude and phase for modulated sensitivity. As can be seen, the sensitivity of the tunable filter 114 also remains consistent for various frequency multiplier values. The sensitivity is mathematically equal to 1/1+LoopGain or 1/1−Loopgain depending on whether one defines the loop gain as including the minus sign of the feedback loop or not (in the case of FIG. 3, that loop gain includes the minus sign so the first expression applies). The sensitivity represents the active noise reduction at the feedback microphone 124 (which is slightly different from what it is in the ear at high frequencies), i.e., lower is better. Further, the amount of peaking above zero observed near cross-over, is a direct measure of stability margins. The lower the margins, the higher the peaking and also the higher the amplification. The phase of the sensitivity checks that the system should be stable.

Figure 5:
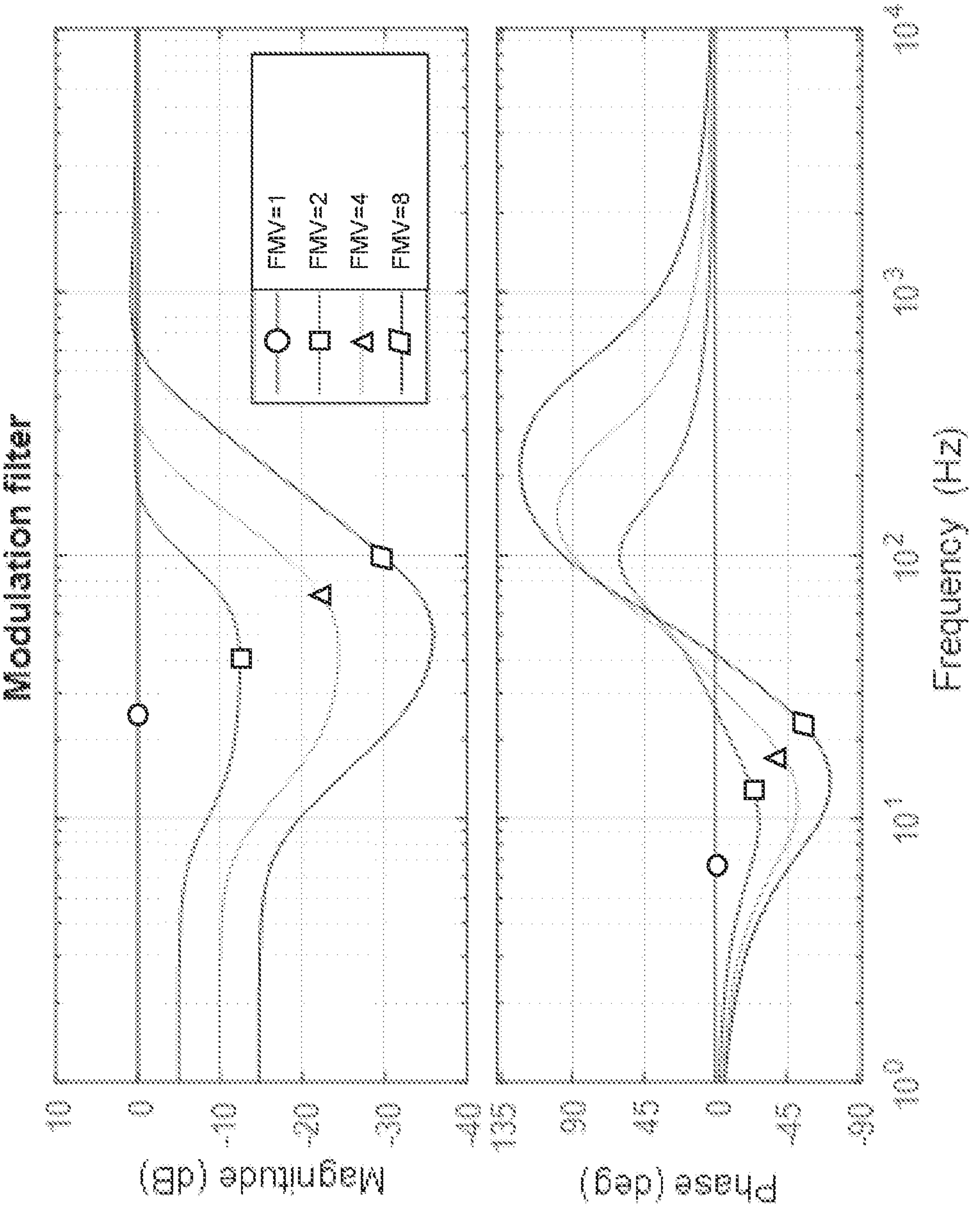
FIG. 5 depicts a tunable filter design to achieve the loops gains of FIG. 3.

FIG. 5 depicts an illustrative tunable filter design to achieve the loop gains of FIG. 3. As can be seen, the nominal loop gain shown in FIG. 3 (FMV=1) is achieved solely by the fixed filter 112.

Returning to FIG. 2, in various implementations the tunable filter 114 is implemented in any manner in which the low frequency cross-over can be increased and decreased while maintaining a similar loop gain shape near that cross-over. In one illustrative embodiment, a look-up table is used to select a set of filter coefficients based on an inputted frequency multiplier value 136. In this manner, the tunable filter 114 is modulated each time a new frequency multiplier value 136 is received to maintain a similar shape at the low frequency cross-over. In such embodiments, tunable filter 114 may be implemented with a set of biquad filters, also known as second-order-section (SOS) filters, which can be dynamically updated to alter the loop gain and meet the cross-over requirements. In one approach, the filter coefficients are pre-calculated for a set of stepped FMV's (e.g. 10). As the FMV being fed into the tunable filter 114 changes, the closest of the 10 at any given time is chosen and the corresponding filter coefficients in the look-up table are loaded into the tunable filter. In a further variant, when the FMV falls between two values in the look-up table, interpolated coefficients are calculated to get a smoother changing filter. In yet a further variant, the coefficients are calculated on the fly based on the FMV and then loaded them into the filter, which removes the need for a look-up table, but requires more computational resources.

In another embodiment, tunable filter 114 is implemented with a set of "fixed" biquad filters, in which each is associated with one or more frequency multiplier values. In this case, the coefficients do not change when the frequency multiplier value 136 changes, but instead a different actual filter is selectively utilized.

It is understood that one or more of the functions in ANR device 200 may be implemented as hardware and/or software, and the various components may include communications pathways that connect components by any conventional means (e.g., hard-wired and/or wireless connection). For example, one or more non-volatile devices (e.g., centralized or distributed devices such as flash memory device (s)) can store and/or execute programs, algorithms and/or parameters for one or more systems in the ANR device 200. Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Commonly labeled components in the Figures are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value +/−a margin of error, such as a measurement error, which may range from up to 1-5 percent.

A number of implementations have been described. Nevertheless, it will be understood that additional modifications may be made without departing from the scope of the inventive concepts described herein, and, accordingly, other implementations are within the scope of the following claims.

We claim:

1. An active noise reduction (ANR) system for a wearable device, the system comprising:
- a fixed filter that receives a signal from a feedback microphone and outputs a noise reduction signal, wherein the fixed filter is configured to provide ANR with a nominal loop gain; and
- a tunable filter that outputs an adjusted noise reduction signal by modulating the nominal loop gain in response to low frequency noise being detected in the noise reduction signal, wherein modulating the nominal loop gain includes reducing low frequency ANR performance.

2. The ANR system of claim 1, wherein modulating the nominal loop gain further includes returning the low frequency ANR performance back to a baseline operating level.

3. The ANR system of claim 2, wherein the low frequency ANR performance is returned back to the baseline operating level in response to low frequency noise no longer being detected.

4. The ANR system of claim 3, wherein returning the low frequency ANR performance back to the baseline operating level is implemented with a decay function.

5. The ANR system of claim 1, wherein reducing low frequency ANR performance includes modulating frequencies signals below approximately 100 Hz.

6. The ANR system of claim 1, wherein an amount of reduction in low frequency ANR performance is determined based on an amount of low frequency noise detected by the feedback microphone.

7. The ANR system of claim 6, wherein a loop gain shape is substantially maintained as a low frequency cross-over increases or decreases during the loop gain modulation.

8. The ANR system of claim 7, wherein the tunable filter is configured to change the low frequency cross-over by a factor determined by an inputted frequency multiplier value.

9. The ANR system of claim 7, wherein maintaining a substantially similar loop gain shape as the low frequency cross-over increases or decreases provides a balance between the low frequency ANR performance and ANR stability margins.

10. A method for providing active noise reduction (ANR) for a wearable device, the method comprising:
- processing a signal from a feedback microphone to generate a noise reduction signal using ANR with a nominal loop gain; and
- modulating the nominal loop gain in response to low frequency noise being detected in the noise reduction signal, wherein modulating the nominal loop gain includes reducing low frequency ANR performance.

11. The method claim 10, wherein modulating the nominal loop gain further includes returning the low frequency ANR performance back to a baseline operating level.

12. The method of claim 11, wherein the low frequency ANR performance is returned back to the baseline operating level in response to low frequency noise no longer being detected.

13. The method of claim 12, wherein returning the low frequency ANR performance back to the baseline operating level is implemented with a decay function.

14. The method of claim 10, wherein reducing low frequency ANR performance includes modulating frequencies signals below approximately 100 Hz.

15. The method of claim 10, wherein an amount of reduction in low frequency ANR performance is determined based on an amount of low frequency noise detected from the feedback microphone.

16. The method of claim 15, wherein a loop gain shape is substantially maintained as a low frequency cross-over increases or decreases during the loop gain modulation.

17. The method of claim 16, wherein the low frequency cross-over is changed by a factor determined by an inputted frequency multiplier value.

18. The method of claim 16, wherein maintaining a substantially similar loop gain shape as the low frequency cross-over increases or decreases provides a balance between the low frequency ANR performance and ANR stability margins.

19. A wearable audio device having active noise reduction (ANR), comprising:
- a feedback microphone;
- an electroacoustic transducer; and
- a feedback compensator configured to output a noise reduction signal to the electroacoustic transducer in response to a signal from the feedback microphone according to a method that comprises:
  - processing the signal from the feedback microphone to generate a noise reduction signal using ANR with a nominal loop gain; and
  - modulating the nominal loop gain in response to low frequency noise being detected in the noise reduction signal, wherein modulating the nominal loop gain includes reducing low frequency ANR performance.

20. The wearable device of claim 19, wherein an amount of reduction in low frequency ANR performance is determined based on a detected amount of low frequency noise.

* * * * *